(12) United States Patent
Arman et al.

(10) Patent No.: US 6,588,224 B1
(45) Date of Patent: Jul. 8, 2003

(54) INTEGRATED ABSORPTION HEAT PUMP THERMOACOUSTIC ENGINE REFRIGERATION SYSTEM

(75) Inventors: Bayram Arman, Grand Island, NY (US); Dante Patrick Bonaquist, Grand Island, NY (US); John Henri Royal, Grand Island, NY (US); Arun Acharya, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/191,528

(22) Filed: Jul. 10, 2002

(51) Int. Cl.[7] ................................................ F25B 27/00
(52) U.S. Cl. ................... 62/238.3; 62/323.1; 62/238.6; 62/197; 62/467; 62/6
(58) Field of Search ................... 62/238.3, 197, 62/116, 218, 6, 467, 238.6, 323.1

(56) References Cited

U.S. PATENT DOCUMENTS

| | | | | |
|---|---|---|---|---|
| 4,584,840 A | * | 4/1986 | Baumann | 62/6 |
| 4,907,738 A | * | 3/1990 | Harris | 237/2 |
| 5,174,130 A | * | 12/1992 | Lucas | 62/498 |
| 5,303,555 A | * | 4/1994 | Chrysler et al. | 62/6 |
| 5,339,640 A | * | 8/1994 | Reinke | 62/6 |
| 5,435,136 A | * | 7/1995 | Ishizaki et al. | 60/517 |
| 5,515,694 A | * | 5/1996 | Meloling et al. | 62/197 |
| 5,528,924 A | * | 6/1996 | Wajid et al. | 73/24.06 |
| 5,996,345 A | | 12/1999 | Hofler | 60/517 |
| 6,164,073 A | * | 12/2000 | Swift et al. | 60/721 |
| 6,205,812 B1 | | 3/2001 | Acharya et al. | 62/607 |
| 6,233,946 B1 | * | 5/2001 | Masuda | 62/6 |
| 6,314,740 B1 | * | 11/2001 | De Blok et al. | 62/6 |
| 6,374,617 B1 | | 4/2002 | Bonaquist et al. | 62/6 |

OTHER PUBLICATIONS

Swift, "Thermoacoustic Engines and Refrigerators", Physics Today (1995) pp 22–28.

* cited by examiner

Primary Examiner—William C. Doerrler
Assistant Examiner—Mark Shulman
(74) Attorney, Agent, or Firm—Stanley Ktorides

(57) ABSTRACT

A system for generating refrigeration wherein a hot process fluid is used to drive a thermoacoustic engine and residual heat from the process fluid is used to desorb refrigerant from a high pressure absorbent heat pump solution with the resulting refrigerant expanded to generate refrigeration prior to being reabsorbed by the absorbent.

10 Claims, 1 Drawing Sheet

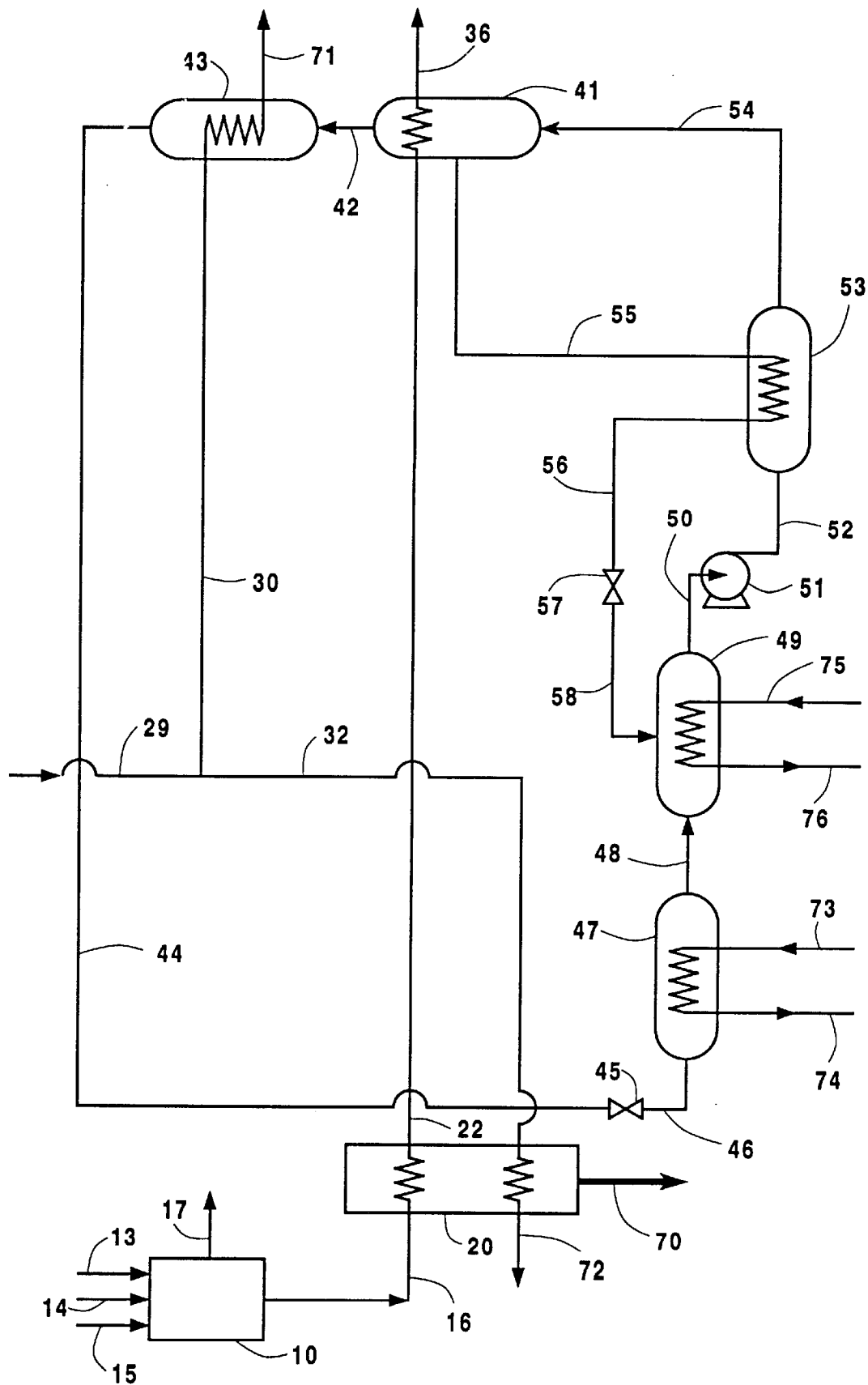

INTEGRATED ABSORPTION HEAT PUMP THERMOACOUSTIC ENGINE REFRIGERATION SYSTEM

TECHNICAL FIELD

This invention relates generally to refrigeration.

BACKGROUND ART

A thermoacoustic engine is a device that employs a tube containing hot and cold end heat exchangers thermally linked by a stack of parallel plates or by a regenerator matrix to convert thermal energy to acoustic or pressure energy. The work of the acoustic energy can be used to produce mechanical work, electricity or refrigeration. The thermal energy provided to the thermoacoustic engine is typically not fully used in the thermoacoustic engine to generate the acoustic energy. A system for gainfully employing the remnant thermal energy from a thermoacoustic engine, such as to produce refrigeration, would be highly desirable.

Accordingly, it is an object of this invention to provide a system for employing remnant thermal energy from a thermoacoustic engine to generate refrigeration.

SUMMARY OF THE INVENTION

The above and other objects, which will become apparent to those skilled in the art upon a reading of this disclosure, are attained by the present invention, one aspect of which is:

A method for generating refrigeration comprising:
(A) producing a hot fluid and using a first portion of the heat of the hot fluid to produce acoustic energy;
(B) providing a high pressure heat pump solution comprising refrigerant and absorbent, and using a second portion of the heat of the hot fluid to warm the high pressure heat pump solution and to separate the high pressure heat pump solution into refrigerant fluid and absorbent fluid;
(C) expanding the refrigerant fluid to generate refrigeration and providing refrigeration from the refrigerant fluid to a heat load;
(D) mixing the resulting refrigerant fluid with absorbent fluid to produce reconstituted heat pump solution; and
(E) increasing the pressure of the reconstituted heat pump solution to produce said high pressure heat pump solution.

Another aspect of the invention is:

Apparatus for generating refrigeration comprising:
(A) a thermoacoustic engine, a refrigerant generator, means for passing a hot fluid to the thermoacoustic engine, and means for passing the hot fluid from the thermoacoustic engine to the refrigerant generator;
(B) an expansion device and means for passing refrigerant fluid from the refrigerant generator to the expansion device;
(C) a heat exchanger and means for passing refrigerant fluid from the expansion device to the heat exchanger;
(D) an absorber, means for passing refrigerant fluid from the heat exchanger to the absorber, and means for passing absorbent fluid from the refrigerant generator to the absorber; and
(E) a compression device, means for passing fluid from the absorber to the compression device, and means for passing fluid from the compression device to the refrigerant generator.

BRIEF DESCRIPTION OF DRAWING

The sole FIGURE is a schematic representation of one preferred embodiment of the refrigeration system of this invention.

DETAILED DESCRIPTION

The invention will be described in detail with reference to the Drawing. Referring now to the FIGURE, fuel 14 and oxidant 15 are provided into combustion zone 10 wherein they are combusted. The fuel may be any suitable fuel. Preferably the fuel is a gaseous fuel such as methane, propane or natural gas. The oxidant may be air, oxygen-enriched air, or commercial oxygen having an oxygen purity of 99.5 mole percent or more. If desired, a process fluid 13 may also be provided into combustion zone 10 to absorb, either by direct or indirect heat exchange, heat from the hot combustion reaction products resulting from the combustion of fuel 14 and oxidant 15. Combustion reaction exhaust is removed from combustion zone 10 in exhaust stream 17. Examples of fluids which may be used as the process fluid 13 in the practice of this invention include water or steam, liquid metals, helium, air, nitrogen and flue gas.

Hot fluid is withdrawn from combustion zone 10 in stream 16. The hot fluid may comprise combustion reaction products from the combustion of fuel 14 and oxidant 15 and/or may comprise heated process fluid 13. The hot fluid in stream 16 has considerable thermal energy and typically has a temperature within the range of from 400° C. to 1000° C. Any other suitable method for producing a hot fluid 16 may also be used in the practice of this invention.

Hot fluid 16 is provided to thermoacoustic engine 20 wherein a first portion of the heat or thermal energy contained in hot fluid 16 is used to generate acoustic or pressure pulse energy. Thermoacoustic engines and their operation are known. A good description of thermoacoustic engines may be found at Physics Today, "Thermoacoustic Engines and Refrigerators", Gregory W. Swift, pp. 22–27, July 1995. The acoustic energy or acoustic work produced by thermoacoustic engine 20, represented by arrow 70 in the FIGURE, may be used to generate electricity by being provided to a generator, such as a linear generator, or may be used to generate refrigeration by being provided to an acoustic refrigerator such as a pulse tube refrigerator, or may be converted to shaft work by mechanical means.

The hot fluid exiting thermoacoustic engine 20 in stream 22, now at a lower temperature than that of stream 16 and typically within the range of from 300° C. to 700° C., is passed to refrigerant generator 41. Also passed into refrigerant generator 41 is high pressure heat pump solution 54 which typically is at a pressure within the range of from 20 to 500 pounds per square inch absolute (psia). The heat pump solution comprises refrigerant and absorbent. Typically high pressure heat pump solution 54 comprises from 20 to 80 weight percent refrigerant and from 80 to 20 weight percent absorbent. Among the refrigerants which may be used in the practice of this invention one can name ammonia, water and methanol. Among the absorbents which may be used in the practice of this invention one can name water, lithium bromide, lithium nitrite, potassium nitrite, sodium nitrite, and sodium thiocyanate.

Within refrigerant generator 41 the high pressure heat pump solution is heated by indirect heat exchange with intermediate temperature hot fluid 22. Thus a second portion of the heat or thermal energy of the hot fluid is used to warm the high pressure heat pump solution. The heating of the high pressure heat pump solution serves to desorb some of the refrigerant out from the absorbent. Resulting desorbed refrigerant fluid is withdrawn from refrigerant generator 41 in stream 42 and remaining absorbent fluid, typically comprising from 10 to 60 weight percent refrigerant and from 40 to 90 weight percent absorbent, is withdrawn from refrigerant generator 41 in stream 55. The spent process fluid is withdrawn from refrigerant generator 41 in stream 36. In a closed system stream 36 may be recycled to hot fluid generator or combustion zone 10 as stream 13.

Refrigerant in stream 42 is passed to cooler 43 wherein it is cooled by indirect heat exchange with coolant such as cooling water. In the embodiment of the invention illustrated in the FIGURE, cooling water 29 is provided in stream 30 to cooler 43 to cool the high pressure refrigerant fluid, emerging therefrom as warmed cooling water 71. Another portion of cooling water 29 is provided in stream 32 to provide cooling to thermoacoustic engine 20, emerging therefrom as warmed cooling water 72.

Cooled high pressure refrigerant fluid, generally entirely in the vapor phase, is withdrawn from cooler 43 in stream 44 and passed to an expansion device, typically a Joule-Thomson valve 45 or a throttle valve. The refrigerant fluid is expanded by passage through the expansion device thereby generating refrigeration, and is passed out from the expansion device as refrigeration bearing refrigerant fluid 46 which typically has a pressure within the range of from 10 to 200 psia and has a temperature within the range of from −40° C. to 15° C. Generally the refrigeration bearing refrigerant fluid in stream 46 is in two phases, a liquid phase and a vapor phase. Refrigeration bearing refrigerant fluid 46 is provided to heat exchanger or evaporator 47 wherein it is warmed and the liquid portion vaporized by indirect heat exchange with a heat load thereby providing refrigeration to the heat load. In the embodiment of the invention illustrated in the FIGURE, the heat load is a fluid stream 73 provided to heat exchanger 47 which emerges therefrom as refrigerated fluid in stream 74. The refrigerated fluid may be used in any suitable application, such as for example, for food freezing, industrial cooling or air conditioning.

The warmed refrigerant fluid from heat exchanger 47 is passed in stream 48 to absorber 49. Absorbent fluid in stream 55 is cooled in secondary heat exchanger 53, passed in stream 56 to valve 57 and then as stream 58 into absorber 49 wherein it mixes with refrigerant fluid provided therein in stream 48 to produce reconstituted heat pump solution wherein the refrigerant fluid in vapor form is absorbed by the absorbent. The heat of absorption is removed by indirect heat exchange with cooling fluid, typically water, which is provided to absorber 49 in stream 75 and removed therefrom in stream 76.

The reconstituted heat pump solution is withdrawn from absorber 49 in stream 50 and increased in pressure by passage through a compression device, such as liquid pump 51, to a pressure within the range of from 20 to 500 psia to form high pressure heat pump solution 52. The high pressure heat pump solution 52 is warmed in secondary heat exchanger 53 by indirect heat exchange with the aforesaid cooling absorbent fluid in stream 55. The resulting high pressure heat pump solution is withdrawn from heat exchanger 53 as stream 54 for passage to refrigerant generator 41 and the absorbent heat pump refrigeration cycle begins anew.

A simulation of the refrigeration system of this invention was carried out in accord with the embodiment illustrated in the FIGURE, and the results of the simulation are presented in Table 1. The numerals in Table 1 correspond to those of the FIGURE. In the saturated conditions were assumed for streams 44, 48, 54 and 55 and pressure drops were neglected. The flows were based on the production of one ton of refrigeration. The heat pump solution comprised water as the refrigerant and a lithium bromide-water mixture as the absorbent. The example of the invention reported in Table 1 is provided for illustrative purposes and is not intended to be limiting.

TABLE 1

| Stream | Temp ° C. | Flow, m Lb/(hr) (ton) | Press. P psia | Mix, x Lb LiBr/lb mix |
|---|---|---|---|---|
| 22 | 104 | 15.78 | 17.2 | — |
| 36 | 104 | 15.78 | 17.2 | — |
| 41 | 93 | — | 24.1 | — |
| 42 | 93 | 0.198 | 24.1 | 0.00 |
| 44 | 38 | 0.198 | 24.1 | 0.00 |
| 46 | 4 | 0.198 | 3.1 | 0.00 |
| 48 | 4 | 0.198 | 3.1 | 0.00 |
| 50 | 38 | 2.580 | 3.1 | 0.60 |
| 52 | 48 | 2.580 | 24.1 | 0.60 |
| 54 | 82 | 2.580 | 24.1 | 0.60 |
| 55 | 93 | 2.380 | 24.1 | 0.65 |
| 56 | 56 | 2.380 | 24.1 | 0.65 |
| 58 | | 2.380 | 3.1 | 0.65 |

Although the invention has been described in detail with reference to a certain preferred embodiment, those skilled in the art will recognize that there are other embodiments of the invention within the spirit and the scope of the claims.

What is claimed is:

1. A method for generating refrigeration comprising:
   (A) producing a hot fluid and using a first portion of the heat of the hot fluid to produce acoustic energy;
   (B) providing a high pressure heat pump solution comprising refrigerant and absorbent, and using a second portion of the heat of the hot fluid to warm the high pressure heat pump solution and to separate the high pressure heat pump solution into refrigerant fluid and absorbent fluid;
   (C) expanding the refrigerant fluid to generate refrigeration and providing refrigeration from the refrigerant fluid to a heat load;
   (D) mixing the resulting refrigerant fluid with absorbent fluid to produce reconstituted heat pump solution; and
   (E) increasing the pressure of the reconstituted heat pump solution to produce said high pressure heat pump solution.

2. The method of claim 1 wherein the refrigerant fluid is cooled prior to being expanded.

3. The method of claim 1 wherein the expanded refrigerant fluid is a two phase fluid.

4. The method of claim 1 wherein the acoustic energy is used to generate refrigeration.

5. Apparatus for generating refrigeration comprising:
   (A) a thermoacoustic engine, a refrigerant generator, means for passing a hot fluid to the thermoacoustic engine, and means for passing the hot fluid from the thermoacoustic engine to the refrigerant generator;
   (B) an expansion device and means for passing refrigerant fluid from the refrigerant generator to the expansion device;
   (C) a heat exchanger and means for passing refrigerant fluid from the expansion device to the heat exchanger;
   (D) an absorber, means for passing refrigerant fluid from the heat exchanger to the absorber, and means for passing absorbent fluid from the refrigerant generator to the absorber; and (E) a compression device, means for passing fluid from the absorber to the compression device, and means for passing fluid from the compression device to the refrigerant generator.

6. The apparatus of claim 5 wherein the means for passing refrigerant fluid from the refrigerant generator to the expansion device comprises a cooler.

7. The apparatus of claim 5 wherein the expansion device is a Joule-Thomson valve.

8. The apparatus of claim 5 wherein the compression device is a liquid pump.

9. The apparatus of claim 5 wherein the means for passing absorbent fluid from the refrigerant generator to the absorber includes a secondary heat exchanger.

10. The apparatus of claim 9 wherein the means for passing fluid from the compression device to the refrigerant generator includes the secondary heat exchanger.

* * * * *